United States Patent [19]

Barry, Jr. et al.

[11] Patent Number: 5,240,644
[45] Date of Patent: Aug. 31, 1993

[54] POLYANILINE DISPERSION AND METHOD FOR MAKING SAME

[75] Inventors: Carey N. Barry, Jr.; Hans H. Kuhn, both of Spartanburg, S.C.

[73] Assignee: Milliken Research Corporation, Spartanburg, S.C.

[21] Appl. No.: 802,210

[22] Filed: Dec. 4, 1991

Related U.S. Application Data

[63] Continuation-in-part of Ser. No. 448,459, Dec. 11, 1989, abandoned.

[51] Int. Cl.$^5$ .................... H01B 1/00; H01B 1/20
[52] U.S. Cl. .................... 252/500; 252/518; 528/422; 528/487; 525/534
[58] Field of Search ............... 252/500, 518; 528/210, 528/214, 215, 216, 218, 422, 423, 424, 487, 489; 525/534, 535, 540

[56] References Cited

U.S. PATENT DOCUMENTS

| | | | |
|---|---|---|---|
| 4,959,180 | 10/1990 | Armes et al. | 528/422 |
| 4,983,322 | 1/1991 | Elsenbaumer | 252/518 |
| 5,006,278 | 4/1991 | Elsenbaumer | 252/500 |

OTHER PUBLICATIONS

Cooper et al. "Electrically Conducting Organic Films and Beads . . . " 22 J. Phys. D.: Appl. Phys. pp. 1580-1585 (1989).
Armes et al. "Despersions of Electrically Conducting Polypyrrole . . . " J. Chem. Soc., Chem. Commun. pp. 288-290 (1987).
Armes et al. "Novel Colloidal Dispersions of Polyaniline" J. Chem. Soc. Chem. Commun. pp. 88-89 (1989).
Vassar et al. "Aqueous Suspension of Conducting Material from Polypyrrole . . . " Polymer Communications pp. 103-104 (1987).
Andreatta et al. "Electrically Conductive Fibers of Polyaniline Spun from Solutions . . . " Synthetic Metals, vol. 26, pp. 383-389 (1988).
Abe et al. "Soluble and High Molecular Weight Polyaniline" J. Chem. Soc. Chemical Commun. pp. 1736-1738 (1989).
Inoue et al. "New Soluble Polyaniline:Synthesis, Electrical Properties . . . " Synthetic Metals, vol. 30, pp. 199-207 (1989).
Li et al. "Soluble Polyaniline" Synthetic Metals, vol. 20, pp. 141-149 (1987).
Li et al. "Synthesis and Characterization of Soluble Polyaniline" Synthetic Metals, vol. 29, pp. E329-336 (1989).
Yang et al. "Chitaline Materials:Soluble Chitosan-Polyaniline . . . " Synthetic Metals, vol. 32, pp. 191-200 (1989).
Caudery et al. "Colloidal Dispersions of Electrically Conducting Polypyrrole . . . " J. Chem. Soc. Chem. Commun. pp. 1189-1190 (1988).

Primary Examiner—Paul Lieberman
Assistant Examiner—M. Kopec
Attorney, Agent, or Firm—Timothy J. Monahan; Terry T. Moyer

[57] ABSTRACT

A method is provided for the preparation of a conductive composition containing a polymerized aromatic amine wherein the aromatic amine is oxidatively polymerized in an acidic aqueous medium in the presence of an oxidizing agent, a doping agent and an aromatic polyalkyleneoxide in an amount sufficient to stabilize the resulting composition. Preferably, the aromatic amine is aniline or a substituted aniline. Compositions produced by such method are also disclosed. These compositions are useful for treating various substrates to make such substrates conductive.

15 Claims, No Drawings

POLYANILINE DISPERSION AND METHOD FOR MAKING SAME

RELATED INVENTIONS

This application is a continuation of U.S. patent application Ser. No. 07/448,459 filed Dec. 11, 1989, abandoned, specific mention being made herein to obtain the benefit of its filing date.

1. Field of the Invention

The present invention relates to an aqueous dispersion of polyaniline and to a method for the preparation of the dispersion. More particularly, the present invention relates to the polymerization of aniline, or aniline derivatives, in the presence of aromatic polyalkyleneoxides resulting in the preparation of finely divided particles of polyaniline dispersed in an aqueous medium. This stable dispersion can be applied to various substrates such as coated surfaces, paper, films, nonwovens and textiles rendering such substrates electrically conductive.

2. Background of the Invention

Since the discovery that polyacetylene could be rendered highly conductive by carefully controlled oxidation or reduction ("doping"), the field of conductive organic polymers has been extensively studied. Commercial interest in these materials includes their use in antistatic coatings, conductive paints, electromagnetic shielding, and electrode coatings. These materials have also been sought for treatment of textiles or other woven substrates in order to make them conductive.

The realization of these applications has not kept pace with expectations, however, largely because of "intractability" or difficulty in processing these polymers. For example although polyaniline (PANI) has emerged as one of the more promising conducting polymers because of the combination of its chemical stability under ambient conditions and its useful levels of electrical conductivity, it is still generally considered intractable. Processing PANI has proved difficult because of its tendency to decompose below its softening or melting point and also because the conductive form is practically insoluble in most solvents. Andreatta, et al., Synthetic Metals 26,383 (1988); Watanabe, et al., J. Chem. Soc., Chem. Commun., 3 (1987). As a result, it is difficult, if not impossible, to process polyaniline by conventional polymer processing techniques, including molding and extrusion, which require softening or melting of the polymer or solubilizing the polymer. Other conducting organic polymers, such as polyacetylene, decompose upon exposure to moisture in the atmosphere, thus prohibiting manufacturing under ambient conditions and requiring processing under exceptional and expensive conditions.

Several techniques have been proposed to circumvent the intractability of conductive polymers. See, for example, those discussed in G. L. Baker, "Progress Toward Processable, Environmentally Stable Conducting Polymers," in Electronic and Photonic Applications of Polymers; Advances in Chemistry Series; American Chemical Society: Washington, DC, 1988; pp. 271-296.

Another approach is disclosed in U.S. Pat. No. 4,803,096, to Kuhn, et al., which produces conductive substrates by exposing a substrate, such as a woven fabric, to a mixture of pyrrole or aniline, an oxidizing agent and a doping agent or counter ion such that a prepolymer is formed in solution and then adhered to the substrate to form a uniform conductive coating of polypyrrole or polyaniline.

Other attempts to make PANI tractable have concentrated on making PANI soluble in a desired solvent. Such techniques fall into four basic categories. The first approach utilizes ring substituted polyanilines, wherein the ring substitutions are intended to increase the solubility of the aniline derivative (see, for example, U.S. Pat. Nos. 4,762,644 and 4,615,829; MacInnes et al., Synth. Met. 25, 235(1988). The second technique graft polymerizes aniline to a polymer backbone which has substituent groups that will aid in the solubilization of the grafted polymer (see, for example, Li, et al., Synth. Met. 20, 141(1987). The third method dopes the aniline polymerization mixture with large organic protonic acids to form more soluble complexes (see for example, U.S. Pat. No. 4,269,540 and Li, et al., supra). The fourth, and final, approach relies on formation of an "ABA" block copolymer in which A is a polyaniline segment and B contributes to solubility (see, for example, U.S. Pat. Nos. 4,806,271 and 4,798,685).

Although these methods have succeeded to a limited extent in producing solubilized forms of PANI which were processable from solution, they have not proven useful in many instances because the soluble species is either an undoped and/or a nonconductive form of PANI, their conductivity is significantly lowered or their tractability is only marginally improved. Andreatta, et al., supra. Furthermore, many of these materials give significant solubility only in solvents that are undesirable for use in a commercial/industrial environment due to cost, corrosiveness or other safety considerations.

Stable dispersion of conductive polymers has been suggested as another way to improve tractability. G. L. Baker, supra. Dispersions of electrically conducting polymers other than PANI have been reported. Dispersions of polypyrrole have been prepared by several groups to improve its processing characteristics. These polypyrrole particles were stabilized by physical adsorption of polymeric curfactants, such as methylcellulose, poly(vinyl alcohol) and poly(vinyl pyrrolidone), to the particle. Bjorklund, et al., J. Chem. Soc., Chem. Commun., 1293(1986); Armes, et al., J. Chem. Soc., Chem. Commun., 288(1987); Armes, et al., Proceedings of the International Conference on the Science and Technology of Synthetic Metals (ICSM '88) (1989); Armes, et al., J. Coll, Interface Sci., 118, 410(1987); Cawdery, et al., J. Chem. Soc. Chem. Commun. 1189(1989). Latexes of polyacetylene have also been prepared. Edwards, et al., Makromol. Chem. Rapid Commun. 4, 393 (1983).

However, although dispersions of PANI prepared similarly would be expected to exhibit superior stability relative to other conductive polymers, it has been reported that PANI dispersions cannot be prepared by these methods under comparable conditions except in a few cases in which low yields were obtained. Armes, et al., J. Chem. Soc., Chem. Commun., 88(1989). As a result, other methods have been employed in attempts to form PANI dispersions. For example, Armes, et al., J. Chem. Soc., Chem. Commun., 88(1989), prepared a colloidal polyaniline using a "tailor made" random stabilizing copolymer [such as 2- and 4-vinyl pyridine or poly(vinyl alcohol-co-vinyl acetate)] containing pendant aniline groups which participate in the in situ aniline polymerization step, resulting in chemical grafting of the stabilizing polymer to polyaniline particles.

However, these preparations require specially prepared copolymers which are not commercially available and long reaction times. In addition, the stabilizer copolymers are chemically sensitive resulting in incompatibility with many common oxidizing agents. These dispersions are also pH sensitive leading to flocculation upon addition of base. Finally, the dispersions may not provide the high levels of conductivity on treated substrates as the dispersions of the present invention.

SUMMARY OF THE INVENTION

It is thus an object of the present invention to provide stable dispersions of electrically conductive PANI or other oxidatively polymerized aromatic amine. The resulting dispersions provide for ease in handling the conductive material facilitating the preparation of coatings, films, etc. The dispersions exhibit very good shelf life with little or no settling of the conductive polymer and no discernable loss in conductivity. These dispersions can be applied to various substrates such as coated surfaces, paper, films, nonwovens and textiles imparting electrical conductivity to the substrate. Such substrates can then be used as, for example, antistatic floor coverings, antistatic garments, components in computers, and generally as replacements for metallic conductors, or semiconductors, including batteries, photovoltaic cells, electrostatic dissipation, electrically conducting adhesives and electromagnetic shielding (e.g., electromagnetic interference shields for computers and other sensitive devices).

The dispersions could also be used for the preparation of surface coatings on vehicles or architectural structures, such as buildings and bridges. These coatings, since they contain an electrical conductor, could, for example, reduce metal corrosion (cathodic passivation) and improve camouflage toward electronic surveillance, including radar and microwave.

According to one embodiment of the present invention, a method is provided for the preparation of a conductive composition containing a polymerized aromatic amine wherein the aromatic amine is oxidatively polymerized in an acidic aqueous medium in the presence of an oxidizing agent, a doping agent and an aromatic polyalkyleneoxide in an amount sufficient to stabilize the resulting composition. Preferably, the aromatic amine is aniline or a substituted aniline. Compositions produced by such method are also disclosed. These compositions are useful for treating various substrates to render such substrates conductive.

DETAILED DESCRIPTION OF THE INVENTION

The present invention concerns a stable aqueous composition of an oxidatively polymerized and electrically conductive aromatic amine and processes for the preparation of such polymer compositions. Aniline and substituted aniline are preferred for practicing the present invention. Preferred substituent groups include hydroxy, halogen, $C_1-C_4$ alkyl, $C_1-C_4$ alkyloxy and phenyl, most preferred are hydroxy, Cl, methyl, ethyl, methoxy and ethoxy. The aromatic amine is generally used in an amount from about 0.1 to about 15 grams per 100 grams of aqueous acid, preferably from about 1 to about 10 grams of aromatic amine per 100 grams of aqueous acid.

A variety of known oxidizing agents can be used to effect the oxidative polymerization, including ferric chloride and salts of, persulfate, iodate, periodate and vanadate. Generally, the amount of oxidizing agent is a controlling factor in the polymerization rate and should be at least equimolar to the amount of aromatic amine monomer. However, it may be useful to use a higher or lower amount of the oxidizing agent to control the rate of polymerization or to assure effective utilization of the monomer. For example, a molar ratio of oxidizing agent to aromatic amine monomer up from about 4:1 to about 1:2, preferably 3:1 to 1:1 may be effectively employed.

The oxidative polymerization takes place in an acidic aqueous medium. In general, any strong acid, such as hydrochloric acid, sulfuric acid, p-toluenesulfonic acid, 1,5-naphthalenedisulfonic acid, and trifluoromethanesulfonic acid, can be used to acidify the medium. The acidic medium can also be a mixture of one or more of these acids. The acid component of the polymerization mixture acts as the doping agent in the polymerization process. A preferred method involves the use of hydrochloric acid as the predominant or primary acid and a smaller amount of a less volatile secondary acid such as p-toluenesulfonic acid. The concentration of the primary acid, such as hydrochloric acid, is generally from about 0.5 molar to about 2.0 molar, more preferably from about 1.0 molar to about 1.5 molar. The concentration of the secondary acid, if employed, is based on the amount of polymerizable aromatic amine and is generally from about 0.05 molar to about 0.5 molar (1 mole of secondary acid to 2 moles of aromatic amine). Lower concentrations of the primary acid give poor yields while higher concentrations can result in polymer degradation and reduced conductivity. The secondary acid can be used as a dopant to improve thermal stability of the conductive polymer in the event that the primary acid is volatile.

The stable compositions of the present invention are obtained by oxidative polymerization in the presence of a variety of aromatic polyalkylene oxides. Generally speaking, these aromatic polyalkylene oxides ("APO's") have one of two general formulae:

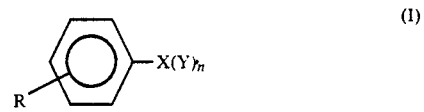

(I)

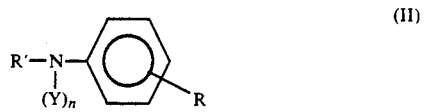

(II)

wherein X is nitrogen or oxygen; R is one or more substituents selected from hydrogen, hydroxy, halogen, $C_1-C_4$ alkyl, $C_1-C_4$ alkoxy, phenyl and amino; preferably hydrogen, hydroxy, Cl, methyl, ethyl, methoxy, ethoxy or amino; R' is phenyl or naphthyl, preferably phenyl; Y is a polymer chain selected from polyethylene oxide, polypropyleneoxide and copolymers of polyethyleneoxide and polypropyleneoxide said polymer chain having about Z repeating units; n is an integer from 1 to 2 and the product of n times Z is from about 20 to about 250, preferably from about 50 to about 150.

In certain APOs, R' can be attached to the main phenyl ring shown in formula II by a carbon-carbon bond or by an intervening group. For example, in "carbazole 100 EO" shown in Table I, R' is attached to the main phenyl ring by a carbon-carbon bond.

It should be stressed that, in a given APO, the alkyleneoxide units need not be evenly distributed between the various oxide chains of the APO. The notation "(EO) 100" or "100 EO", for example, simply denotes that the APO was synthesized by incorporating 100 equivalents of ethyleneoxide in the reaction mixture. In the final APO product, the 100 equivalents may be unevenly distributed between oxide chains in a given APO molecule. In the case of a copolymer, the notation "(EO/PO/EO) 2/15/5" or "2EO 15PO 5EO" denotes reaction of 2 equivalents of ethylene oxide, followed by 15 equivalents of propylene oxide, followed by another 5 equivalents of ethylene oxide. Methods for synthesizing APOs in this manner are well known in the art. Amine salts of compounds of formulae I and II formed from acids such as those disclosed herein, can also be used in practicing the present invention.

Preferred APOs are listed in Table I.

TABLE I

| Structure | Name | Example |
|---|---|---|
| Ph–N(EO)$_{100}$ | Aniline 100 EO | 1–6 |
| Ph–N(EO/PO/EO)$_{2/15/5}$ | Aniline 2 EO 15 PO 5EO | 8, 9 |
| H$_2$N–Ph–N(EO)$_{100}$ | p-Amino Aniline 100 EO | 19–21, 32 |
| H$_2$N–Ph–O(EO)$_{30}$ | Aniline PEG 30 | 15, 16 |
| Ph–N(Ph)(EO)$_{97}$ | Diphenylamine 97 EO | 17 |
| Ph–N(EO)$_{95}$–Ph–NH$_2$ | p-Aminophenyl Phenyl Amine 95 EO | 29 |
| Ph–N(EO)$_{25}$–Ph–NH$_2$ | p-Aminophenyl Phenyl Amine 25 EO | 28 |
| Carbazole(EO)$_{97}$ | Carbazole 97 EO | 11–14 |
| 3-CH$_3$-Ph–N(EO)$_{140}$ | m-Toluidine 140 EO | 10 |
| Ph(NH$_2$)–O(EO)$_{91}$ | Aniline PEG 91 | 30 |

The concentration of APO relative to the polymerizable aromatic amine in the polymerization mixture is generally from about 0.1 to about 10 grams of APO per gram of aromatic amine, preferably from about 0.5 to about 5 grams of APO per gram of aromatic amine. Lesser amounts of the APO may not give stable dispersions, while greater amounts may lead to reduced electrical conductivity of the compositions.

Preparation of the compositions was carried at temperatures from about −5° C. to about 35° C. It is generally recognized that oxidative polymerization of aniline gives a more electrically conductive polymer when conducted at temperatures near 0° C.

The function of the aromatic polyalkylene oxides in the stabilization of these conductive polymer dispersions is not well understood. While not wishing to be bound to any particular theory, it is suspected that the aromatic polyalkylene oxides become chemically bound (e.g., covalently bound) or physically bound (e.g., hydrogen bonded) to the electrically conductive polymer resulting in steric stabilization of the polymer particles.

The compositions obtained by the method of the present invention are quite stable as indicated by the following properties. In the absence of APO's, polyaniline and derivatives of polyaniline are easily filterable from the reaction medium. When the oxidative polymerization is carried out in accordance with the present invention the resulting mixture may pass through filters with pore size as small as 0.5 microns. Furthermore, the dispersions are not easily separated by centrifugation. Stability is also indicated by long shelf life. Separation, or settling, of the dispersions is not visually apparent after several months at rest.

The compositions of the present invention are especially useful for treatment of substrates in order to make such substrates conductive. A substrate is "treated" with a composition by applying the composition to the substrate such that, once applied, the substrate becomes conductive or exhibits enhanced conductance. "Treatment" can include, without limitation, soaking the substrate in the composition, spraying the composition on the surface of the substrate, incorporating the composition into a coating (e.g., paint or adhesive) which is then applied to the substrate material (e.g., polymer or metal) which is further processed to form a conductive article. Other means for applying the compositions to a substrate will be apparent to those skilled in the art. For example, textile fabrics can be immersed in the dispersion and then passed through a squeeze roll ("padded") to give an even coating of the conductive polymer on the fabric. The "padding" process is described in the examples. Upon drying the coated fabric exhibits good conductance. Another feature of the preparations of the present invention is the presence of polyalkyleneoxide chains which can confer secondary characteristics upon treated substrates. It is well known that alkylene oxide chains can be doped with metal salts to give ionic conductors (see, for example L. Charles Hardy and Duward F. Shriver, J. Am. Chem. Soc., 108, 2887(1986)). Thus, when compositions of the present invention are treated with metal salts and then used to make films or coatings, the resulting composite will contain an electrically conducting portion and an ionically conducting portion. This feature is useful in the preparation of solid state electrochemical devices including high energy density batteries, solid state photoelectrochemical cells and solid state transistors.

The following examples are set forth to further illustrate the present invention and should not be construed as limiting the spirit or scope of the invention.

EXAMPLE 1

A solution (Solution A) of ammonium persulfate (68.5 g, 300 mmol) in 1M aqueous hydrochloric acid (250 mL) was cooled to 0°–5° C. and added in one portion to a cooled solution (5° C., Solution B) of aniline 100EO (45.0 g, 10 mmol), aniline hydrochloride (32.4 g, 250 mmol) and p-toluenesulfonic acid monohydrate (23.8 g, 125 mmol) in 1M aqueous hydrochloric acid (500 mL). The resulting mixture was stirred for 1.5 hours at 0°–10° C. with mechanical stirring. During this period the mixture changed color several times becoming, ultimately, a very dark green easily stirred dispersion.

Average particle size = 600 nm (This and all other particle measurements were obtained with a Coulter Nanosizer).

EXAMPLES 2-17

These preparations were made in the same manner as described in Example 1 except that an aromatic polyalkylene-oxide compound listed in Table 2 was used and Solutions A and B were prepared as described in Table 2.

TABLE II

| EXAMPLE NO. | AROMATIC POLYALKYLENE OXIDE (APO) | SOLUTION A | | SOLUTION B | | | |
|---|---|---|---|---|---|---|---|
| | | APS (g) | 1 M HCl (mL) | APO (g) | PhNH$_3$Cl (g) | p-TSA (g) | 1 M HCl (mL) |
| 2 | ANILINE 100EO | 34.2 | 282 | 22.5 | 16.2 | 11.9 | 577 |
| 3 | ANILINE 100EO | 136.9 | 192 | 90.0 | 64.8 | 47.6 | 413 |
| 4 | ANILINE 100EO | 68.5 | 227 | 90.0 | 32.4 | 23.8 | 502 |
| 5 | ANILINE 100EO | 68.5 | 262 | 22.5 | 32.4 | 23.8 | 535 |
| 6 | ANILINE 100EO | 205.4 | 121 | 134.9 | 97.2 | 71.3 | 314 |
| 7 | AN 100EO DIAC | 68.5 | 258 | 45.8 | 32.4 | 23.8 | 516 |
| 8 | ANILINE 2155 | 68.5 | 272 | 12.7 | 32.4 | 23.8 | 553 |
| 9 | ANILINE 2155 | 68.5 | 262 | 45.0 | 32.4 | 23.8 | 531 |
| 10 | m-TOLUID 140EO | 68.5 | 243 | 62.7 | 32.4 | 23.8 | 531 |
| 11 | CARBAZOL 100EO | 68.5 | 250 | 44.2 | 32.4 | 23.8 | 500 |
| 12 | CARBAZOL 100EO | 68.5 | 257 | 22.1 | 32.4 | 23.8 | 515 |
| 13 | CARBAZOL 100EO | 68.5 | 250 | 44.2 | 32.4 | 23.8 | 500 |
| 14 | CARBAZOL 100EO | 136.9 | 208 | 88.4 | 64.8 | 47.6 | 435 |
| 15 | ANILINE PEG 30 | 68.5 | 264 | 14.3 | 32.4 | 23.8 | 541 |
| 16 | ANILINE PEG 30 | 68.5 | 243 | 45.0 | 32.4 | 23.8 | 531 |
| 17 | DIPHAMIN 100EO | 68.5 | 250 | 44.5 | 32.4 | 23.8 | 500 |

KEY
AN 100EO DIAC = ANILINE 100EO DIACETATE
ANILINE 2155 = ANILINE + 2EO − 15PO + 5EO
m-TOLUID 140 EO = m-TOLUIDINE 100 EO
CARBAZOL 100EO = CARBAZOLE 100EO
ANILINE PEG 30 = p-AMINOPHENOL 30EO (EO'S ON THE OXYGEN ATOM)
DIPHAMIN 100EO = DIPHENYLAMINE 100EO
APS = AMMONIUM PERSULFATE
p-TSA = p-TOLUENE SULFONIC ACID

EXAMPLE 18

A mixture of aniline 100EO (1618 g, 0.36 mol) and water (882 mL) was cooled to 5°–10° C. and treated with concentrated HCl (135 mL). When the mixture had cooled to below 10° C., a solution of sodium nitrate (26.1 g, 0.38 mol) in water (50 mL) was added dropwise. The temperature was maintained at about 10° C. during this addition. Following this addition, concentrated HCl (200 mL) was added slowly such that the temperature was kept below 25° C. The mixture was again cooled to 10° C. and was treated with zinc (58.8 g, 0.90 mol) in several portions. The resulting golden mixture was stirred at 10° C. for several hours and allowed to warm to ambient temperature.

EXAMPLE 19

A solution (Solution C) of ammonium persulfate (68.5 g, 0.30 mol) in 1M HCl (237 mL) was cooled to 5° C. and added in one portion to a solution (Solution D) of the product of Example 18 (83.2 g, 0.010 mol of 4-amino aniline 100EO), aniline hydrochloride (32.4 g, 0.25 mol) and p-toluenesulfonic acid monohydrate (23.8 g, 0.125 mol) in 1M HCl (475 mL) also at 5° C. The mixture was stirred at 5° C. for 1.5 h and allowed to warm to ambient temperature.

EXAMPLES 20-21

These preparations were carried out in the same manner as described in Example 19 except that the amount of reagents was changed as shown in Table III.

TABLE III

| EXAMPLE NO. | AROMATIC POLYALKYLENE OXIDE (APO) | SOLUTION C | | SOLUTION D | | | |
|---|---|---|---|---|---|---|---|
| | | APS (g) | 1 M HCl (mL) | APO (g) | PhNH₃Cl (g) | p-TSA (g) | 1 M HCl (mL) |
| 20 | NH2 ANIL 100EO | 34.2 | 272 | 41.6 | 16.2 | 11.9 | 544 |
| 21 | NH2 ANIL 100EO | 68.5 | 251 | 41.6 | 32.4 | 23.8 | 502 |

KEY
APS = AMMONIUM PERSULFATE
NH2 ANIL 100EO = THE PRODUCT OF EXAMPLE 18 WHICH IS ABOUT 54.2% 4-AMINO 100EO

EXAMPLE 22

A solution of ammonium persulfate (68.5 g, 0.30 mol) in 1M HCl (246 mL) was cooled to 5° C. and added to a cooled (5° C.) solution of p-amino phenol 30EO (22.5 g, 0.016 mol), m-toluidine 140EO (22.4 g, 0.0036 mol), aniline hydrochloride (32.4 g, 0.25 mol) and p-toluenesulfonic acid monohydrate (23.8 g, 0.125 mol) in 1M HCl (528 mL). The resulting mixture was stirred for about 1.5 h at 5° C. and allowed to warm to ambient temperature.

EXAMPLE 23

A solution of ammonium persulfate (68.5 g, 0.30 mol) in 1M HCl (250 mL) was cooled to 5° C. and added to a solution of aniline hydrochloride (32.4 g 0.25 mol) and p-toluenesulfonic acid monohydrate (23.8 g, 0.125 mol) in 1M HCl (500 mL). The mixture was stirred for about 1.5 hours at 5° C. affording an easily filterable green precipitate.

EXAMPLE 24

A solution of ammonium persulfate (68.5 g, 0.30 mol) in 1M HCl (250 mL) was cooled to 5° C. and added to a cooled 5° C. solution of polyethylene glycol 3400 (45.0 g), aniline hydrochloride (32.4 g, 0.25 mol) and p-toluenesulfonic acid monohydrate (23.8 g, 0.125 mol) in 1M HCl (500 mL). The mixture was stirred at 5° C. for about 1.5 hours and allowed to warm to ambient temperature.

EXAMPLE 25

A solution of ammonium persulfate (68.5 g, 0.3 mol) in 1M HCl (272 mL) was cooled to 5° C. and added to a cooled (5° C.) mixture of methylcellulose (4.1 g) aniline hydrochloride (32.4 g, 0.25 mol) and p-toluenesulfonic acid monohydrate (23.8 g, 0.125 mol) in 1M HCl (543 mL). The mixture was stirred at 5° C. for about 2.5 hours and allowed to warm to ambient temperature.

EXAMPLE 26

A solution of ammonium persulfate (68.5 g, 0.3 mol) in 1M HCl (272 mL) was cooled to 5° C. and added to a cooled (5° C.) mixture of polyvinylalcohol (MW 77,000, 96% hydrolysed 4.1 g) aniline hydrochloride (32.4 g, 0.25 mol) and p-toluenesulfonic acid monohydrate (23.8 g. 0.125 mol) in 1M HCl (543 mL). The mixture was stirred at 5° C. for about 2.5 hours and allowed to warm to ambient temperature.

EXAMPLE 27

A solution of ammonium persulfate (68.5 g, 0.3 mol) in 1M HCl (272 mL) was cooled to 5° C. and added to a cooled (5° C.) mixture of sodium dodecylbenzenesulfonate (4.1 g), aniline hydrochloride (32.4 g. 0.25 mol) and p-toluenesulfonic acid monohydrate (23.8 g, 0.125 mol) in 1M HCl (543 mL). The mixture was stirred at 5° C. for about 1.5 hours and allowed to warm to ambient temperature.

EXAMPLE 28

A solution of ammonium persulfate (68.5 g, 0.3 mol) in 1M HCl (261 mL) was cooled to 5° C. and added to a cooled (5° C.) mixture of 4-amino(diphenylamine 25EO) (12.7 g, 0.01 mol), aniline hydrochloride (32.4 g, 0.25 mol) and p-toluenesulfonic acid monohydrate (23.8 g, 0.125 mol) in 1M HCl (522 mL). The mixture was stirred at 5° C. for about 3 hours and was allowed to warm to ambient temperature.

EXAMPLE 29

A solution of ammonium persulfate (68.5 g, 0.3 mol) in 1M HCl (262 mL) was cooled to 5° C. and added to a cooled (5° C.) mixture of 4-amino(diphenylamine 95EO) (45.9 g, 0.10 mol), aniline hydrochloride (32.4 g, 0.25 mol) and p-toluenesulfonic acid monohydrate (23.8 g, 0.125 mol) in 1M HCl (512 mL). The mixture was allowed to stir at 5° C. for 1.5 hours and allowed to warm to ambient temperature.

EXAMPLE 30

A solution of ammonium persulfate (68.5 g, 0.3 mL) in 1M HCl (250 mL) was cooled to 5° C. and added to a cooled (5° C.) mixture of 2-amino(phenol 91EO) (41.1 g, 0.01 mol), aniline hydrochloride (32.4 g, 0.125 mol) and p-toluenesulfonic acid monohydrate (23.8 g, 0.125 mol) in 1M HCl (502 mL). The mixture was allowed to stir at 5° C. for about 3 hours and allowed to warm to ambient temperature.

EXAMPLE 31

A solution of ammonium persulfate (68.5 g, 0.3 mol) in 1M HCl (250 mL) was cooled to 5° C. and added to a cooled (5° C.) mixture of Synfac ® 8216 (45.0 g), aniline hydrochloride (32.4 g, 0.125 mol) and p-toluenesulfonic acid monohydrate (23.8 g, 0.125 mol) in 1M HCl (500 mL). Synfac ® 8216 is a bis-styrenated phenol with an average of sixteen ethyleneoxide groups available from Milliken Chemical, Spartanburg, S.C. The mixture was stirred at 5° C. for about 1.5 hours and allowed to warm to ambient temperature.

EXAMPLE 32

A solution of ammonium persulfate (68.5 g, 0.30 mol) in 1M HCl (250 mL) was cooled to about 5° C. and added to a cooled (5° C.) mixture of the product of Example 18 (83.2 g, 0.10 mol of 4-amino aniline 100EO), aniline hydrochloride (32.4 g, 0.25 mol) p-toluenesulfonic acid monohydrate (23.8 g, 0.125 mol) and concentrated hydrochloric acid (39.5 mL) in 2-propanol (435 mL). The mixture was stirred at 5° C. for several hours and was allowed to warm to ambient temperature. The average particle size was 210 nm.

EXAMPLE 33

The conductivity of the preparations made in Examples 1-16, 20 and 21 were compared with preparations containing other "non-APO" dispersants or no dispersant whatsoever. Samples of fabric were padded with each of the exemplified preparations and tested to determine the electrical resistance over the surface of the coated cloth. Samples of polyester fabric (28 g) were immersed in each of the exemplified preparations for 5 to 10 minutes at ambient temperature. (The fabric weighs approximately 57 oz. per square yard and is constructed from a 2/150/34 textured polyester yarn Type 667 from Celanese (construction is such that approximately 70 ends are in the warp direction and 55 picks are in the fill direction)). The treated samples were then passed through a two-roll pad adjusted to express excess liquid and give 100% wet pick-up (about 90 pounds per inch in this case). The samples were then mounted on a pin frame to maintain dimensional integrity during drying and heated at 325° F. for 4 minutes.

Surface resistances of these samples, measured according to AATCC test method 761982, range from about 1000 ohms per square to about 1 million ohms per square. When a mixture of the conductive polymer is prepared in the absence of an APO, the coating is visibly uneven and exhibits very poor conductance upon drying, generally giving surface resistances of greater than 1 million ohms per square. The stability of the electrical conductivity of the polymer preparations of the present invention was demonstrated by application to textile substrates with no significant change in the resulting surface resistance weeks after preparation.

Table 4 summarizes the comparative results.

TABLE IV
POLYESTER FABRICS PADDED WITH POLYANILINE DISPERSIONS

| EXAMPLE | % PANI (OWF) | RESISTANCE (OHMS/SQ.) |
|---|---|---|
| 1 | 2.5 | 12,000 |
| 2 | 1.2 | 120,000 |
| 3 | 4.9 | 14,000 |
| 4 | 2.5 | 100,000 |
| 5 | 2.5 | 45,000 |
| 6 | 7.2 | 23,000 |
| 7 | 2.5 | 92,000 |
| 8 | 2.5 | >40 × 10$^6$ |
| 9 | 2.5 | >40 × 10$^6$ |
| 10 | 2.5 | 20,000 |
| 11 | 2.5 | 600,000 |
| 12 | 2.5 | 20 × 10$^6$ |
| 13 | 3.5 | 225,000 |
| 14 | 5.0 | 107,000 |
| 15 | 2.5 | 20,000 |
| 16 | 2.5 | 6,000 |
| 17 | 2.5 | 6,500 |
| 19 | 2.5 | 2,500 |
| 20 | 1.2 | 5,000 |
| 21 | 2.5 | 344,000 |
| 22 | 2.5 | 4,800 |
| 23 | 2.5 | >40 × 10$^6$ |
| 24 | 2.5 | 6 × 10$^6$ |
| 25 | 2.5 | >40 × 10$^6$ |
| 26 | 2.5 | 8 × 10$^6$ |
| 27 | 2.5 | >40 × 10$^6$ |
| 28 | 2.5 | 2,900 |
| 29 | 2.5 | 98,000 |
| 30 | 2.5 | 151,000 |
| 31 | 2.5 | >40 × 10$^6$ |
| 32 | 2.5 | 1,300 |

We claim:

1. A method of making an aqueous dispersion of a conductive polymer, comprising reacting a solution of an oxidatively polymerizable aromatic amine selected from the group consisting of from aniline and substituted aniline having at least one substituent group selected from hydroxy, halogen, $C_1$-$C_4$ alkyl and $C_1$-$C_4$ alkyloxy and an oxidizing agent capable of and present in sufficient concentration to oxidatively polymerize said aromatic amine, in a 0.5 to 2.5 molar aqueous acid which functions as a doping agent to impart electrical conductivity to said conductivity polymer when subsequently formed, wherein 0.1 to 15 grams of said aromatic amine is present in said solution per 100 grams of said aqueous acid, and further present in said solution is an aromatic polyalkyleneoxide selected from the group consisting of a compound of the general formula I:

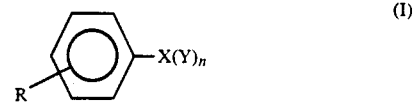

wherein X is nitrogen or oxygen, Y is a polymer chain selected from polyethyleneoxide, polypropyleneoxide and copolymers of polyethyleneoxide and polypropyleneoxide, said polymer having about Z repeating units, n is an integer from 1 to 2, wherein n is 1 when X is oxygen and n is 2 when X is nitrogen, and the product of n times Z is from about 20 to about 250, and R is one or more substituent groups selected from hydrogen, hydroxy, halogen, $C_1$-$C_4$ alkyl, $C_1$-$C_4$ alkyloxy, phenyl and amino; a compound of the general formula II:

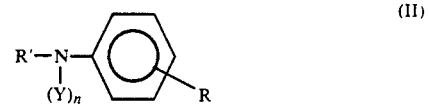

wherein Y and R are defined as for formula I, n is the integer 1 and R' is phenyl or naphthyl; wherein 0.1 to 10 grams of said aromatic polyalkylene oxide is present in said solution per gram of aromatic amine, said solution is maintained at a temperature of between −5° C. and 35° C. during oxidation of said aromatic amine to form said polymer.

2. A method according to claim 1 wherein said acid is selected from hydrochloric acid, sulfuric acid, p-toluenesulfonic acid, 1,5-naphthalenedisulfonic acid and trifluoromethanesulfonic acid.

3. A method according to claim 1 wherein said aromatic amine is aniline and wherein Y is a polyethylene oxide chain.

4. A method according to claim 3 wherein said aromatic polyalkylene oxide is present in said solution from 0.5 to 5 grams per gram of said aromatic amine.

5. A method according to claim 1 wherein said aromatic polyalkylene oxide is selected from the following groups wherein Y represents said polymer chain of monomer units selected from ethylene oxide and propylene oxide:

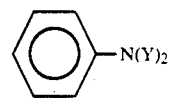

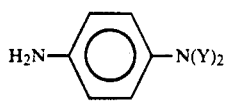

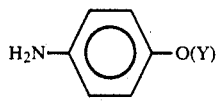

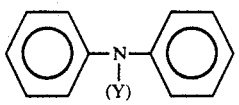

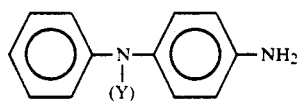

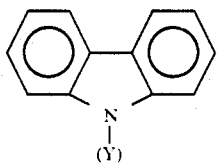

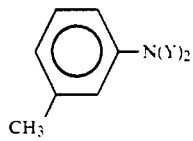

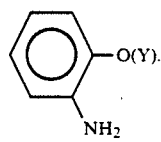

6. A method according to claim 5 wherein said aromatic amine is aniline.

7. A method according to claim 6 wherein Y is a polyethylene oxide chain.

8. A method according to claim 6 wherein said oxidizing agent is selected from ferric chloride and salts of persulfate iodate, periodate and vandate.

9. A method according to claim 6 wherein said acid is selected from hydrochloric acid, sulfuric acid, p-toluenesulfonic acid, 1,5-naphthalene disulfonic acid and trifluoromethane sulfonic acid.

10. A method according to claim 1 wherein said aromatic amine is selected from aniline and substituted aniline having at least one substituent group selected from hydroxy, Cl, methyl, ethyl, methoxy and ethoxy.

11. A method according to claim 10 wherein R is selected from hydrogen, hydroxy, Cl, methyl, ethyl, methoxy, ethoxy and amino and R' is phenyl.

12. A method according to claim 11 wherein said acid is selected from hydrochloric acid, sulfuric acid, p-toluenesulfonic acid, 1,5-naphthalenedisulfonic acid and trifluoromethanesulfonic acid.

13. A method according to claim 12 wherein said aromatic polyalkylene oxide is present in said solution from 0.5 to 5 grams per gram of said aromatic amine.

14. A method according to claim 13 wherein said Y is a polyethylene oxide chain.

15. A method according to claim 14 wherein said oxidizing agent is selected from ferric chloride and salts of persulfate iodate, periodate and vandate.

* * * * *